United States Patent
Rossi et al.

(10) Patent No.: US 12,087,068 B2
(45) Date of Patent: *Sep. 10, 2024

(54) END TO END TRAINABLE DOCUMENT EXTRACTION

(71) Applicant: INTUIT INC., Mountain View, CA (US)

(72) Inventors: Dominic Miguel Rossi, San Diego, CA (US); Xiao Xiao, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,032

(22) Filed: Aug. 22, 2023

(65) Prior Publication Data

US 2023/0394862 A1 Dec. 7, 2023

Related U.S. Application Data

(63) Continuation of application No. 17/649,467, filed on Jan. 31, 2022, now Pat. No. 11,830,264.

(51) Int. Cl.
*G06V 30/412* (2022.01)
*G06T 7/194* (2017.01)
(Continued)

(52) U.S. Cl.
CPC ........ *G06V 30/19173* (2022.01); *G06T 7/194* (2017.01); *G06V 30/1448* (2022.01);
(Continued)

(58) Field of Classification Search
CPC .............. G06V 30/00–41; G06T 7/194; G06T 2207/20021; G06T 2207/20072;
(Continued)

(56) References Cited

U.S. PATENT DOCUMENTS 8,768,057 B2 * 7/2014 Saund ................. G06V 30/155
382/175
8,880,540 B1 * 11/2014 Sampson ............. G06V 30/418
707/758

(Continued)

OTHER PUBLICATIONS

Prasad, "CascadeTabNet: An approach for end to end table detection and structure recognition from image-based documents", arXiv:2004.12629v2 [cs.CV], May 28, 2020, 10 pages.
Reisswig, "Chargrid-OCR: End-to-end Trainable Optical Character Recognition for Printed Documents using Instance Segmentation" arXiv:1909.04469v4 [cs.CV], Feb. 27, 2020, 10 pages.

*Primary Examiner* — Sean T Motsinger
(74) *Attorney, Agent, or Firm* — DLA Piper LLP US

(57) ABSTRACT

A processor may receive an image and identify a plurality of characters in the image using a machine learning (ML) model. The processor may generate at least one word-level bounding box indicating one or more words including at least a subset of the plurality of characters and/or may generate at least one field-level bounding box indicating at least one field including at least a subset of the one or more words. The processor may overlay the at least one word-level bounding box and the at least one field-level bounding box on the image to form a masked image including a plurality of optically-recognized characters and one or more predicted fields for at least a subset of the plurality of optically-recognized characters.

20 Claims, 9 Drawing Sheets

(51) Int. Cl.
  *G06V 30/14* (2022.01)
  *G06V 30/146* (2022.01)
  *G06V 30/18* (2022.01)
  *G06V 30/19* (2022.01)
  *G06V 30/414* (2022.01)

(52) U.S. Cl.
  CPC ............ *G06V 30/146* (2022.01); *G06V 30/18* (2022.01); *G06V 30/19127* (2022.01); *G06V 30/19147* (2022.01); *G06V 30/1916* (2022.01); *G06V 30/414* (2022.01); *G06T 2207/20021* (2013.01); *G06T 2207/20072* (2013.01); *G06T 2207/20081* (2013.01); *G06T 2207/20084* (2013.01); *G06T 2207/30176* (2013.01)

(58) Field of Classification Search
  CPC ........... G06T 2207/20081; G06T 2207/20084; G06T 2207/30176
  See application file for complete search history.

(56) References Cited

U.S. PATENT DOCUMENTS

| | | | |
|---|---|---|---|
| 2006/0282442 A1* | 12/2006 | Lennon | G06F 16/93 |
| 2008/0267505 A1* | 10/2008 | Dabet | G06V 30/412 |
| | | | 382/187 |
| 2017/0109610 A1* | 4/2017 | Macciola | G06F 16/93 |
| 2019/0354818 A1* | 11/2019 | Reisswig | G06N 3/04 |
| 2020/0065635 A1* | 2/2020 | Lim | G06V 10/82 |
| 2020/0082218 A1* | 3/2020 | Hoehne | G06N 3/08 |
| 2020/0302208 A1* | 9/2020 | Hoehne | G06N 3/08 |
| 2021/0081729 A1* | 3/2021 | Huang | G06V 30/412 |
| 2021/0110527 A1* | 4/2021 | Wheaton | G06T 7/0002 |
| 2021/0271872 A1* | 9/2021 | Gupta | G06V 30/40 |
| 2021/0368064 A1* | 11/2021 | Aggarwal | G06F 40/103 |
| 2022/0058422 A1* | 2/2022 | Li | G06N 3/08 |
| 2022/0092328 A1* | 3/2022 | Hoehne | G06T 7/11 |
| 2022/0319217 A1* | 10/2022 | Paliwal | G06V 10/82 |
| 2022/0392047 A1* | 12/2022 | Wheaton | G06V 10/40 |
| 2022/0414328 A1* | 12/2022 | Nguyen | G06V 30/414 |
| 2023/0065915 A1* | 3/2023 | Berestovsky | G06F 40/30 |

* cited by examiner

END TO END TRAINABLE DOCUMENT EXTRACTION

CROSS REFERENCE TO RELATED APPLICATIONS

This application is a Continuation Application of U.S. application Ser. No. 17/649,467 filed Jan. 31, 2022. The entirety of the above-listed application is incorporated herein by reference.

BACKGROUND

It is often useful to digitize information found on paper or other physical documents such as receipts and tax forms. The process of recognizing and digitizing the information often leverages sophisticated optical character recognition (OCR) to discern text, numerals, and/or other information-carrying characters from other features of the physical documents. For example, an imaging device or other computing device may obtain an image of a physical document and may apply OCR to the image to identify information. There are a number of OCR systems, algorithms, and/or services available, such as Google OCR and Amazon Textract, with more being developed all the time.

Many computerized workflows or processes use off-the-shelf or proprietary OCR technologies as part of a broader effort, such as to digitize information and then use the information as part of an overall computing process. For example, in a process to automate information extraction with machine learning after a document is classified, information extraction can be a two-step process. In the first step, a document is passed to a third-party OCR service as an image, and the service returns the textual information on the page together with bounding boxes. In the second step, the returned information is consumed by extraction models that map the textual information returned by OCR onto entities needed for a specific purpose (e.g., tax filing or small-business accounting, including different fields in a tax form, or vendor and date on a receipt, for example) using natural language processing and/or business logic.

Not all OCR systems, algorithms, and/or services work well, or are particularly well suited for particular purposes. For example, many OCR systems are maintained and/or provided by third-party providers (e.g., Google and Amazon). These third-party systems may be subject to change without notice, causing problems with consistency of output. Reliance on third-party OCR providers can slow down the text extraction process (e.g., due to the need for Internet data exchange and/or runtime delays). Moreover, third-party OCR solutions are typically generic in nature, being applicable to any and all inputs, and therefore fail to optimize for particular types of text extraction.

BRIEF DESCRIPTIONS OF THE DRAWINGS

DETAILED DESCRIPTION OF SEVERAL EMBODIMENTS

Embodiments described herein may replace the two-stage extraction system described above with, or may otherwise deploy, a streamlined solution where OCR and information extraction are combined into a single process. For an incoming document page as an image, a model such as a trained fully convolutional neural network model can identify characters and words on the page with their position information (OCR), and identify groupings of the words into different fields of a specialized form (e.g., a tax form, performing information extraction for tax documents), with a single pass of the image through the model. Disclosed embodiments can solve the problem of how to get information from uploaded documents into a useable format for a specific purpose by a single process. Using the single-stage solution described herein can significantly speed up an extraction process and/or can allow end-to-end fine tuning to achieve strong performance for each extraction service (e.g., for different tax forms) by removing the black box third-party OCR service from the overall process. Accordingly, improvements in both speed and performance for OCR-integrated processing may be realized by the embodiments described herein.

Figure 1:
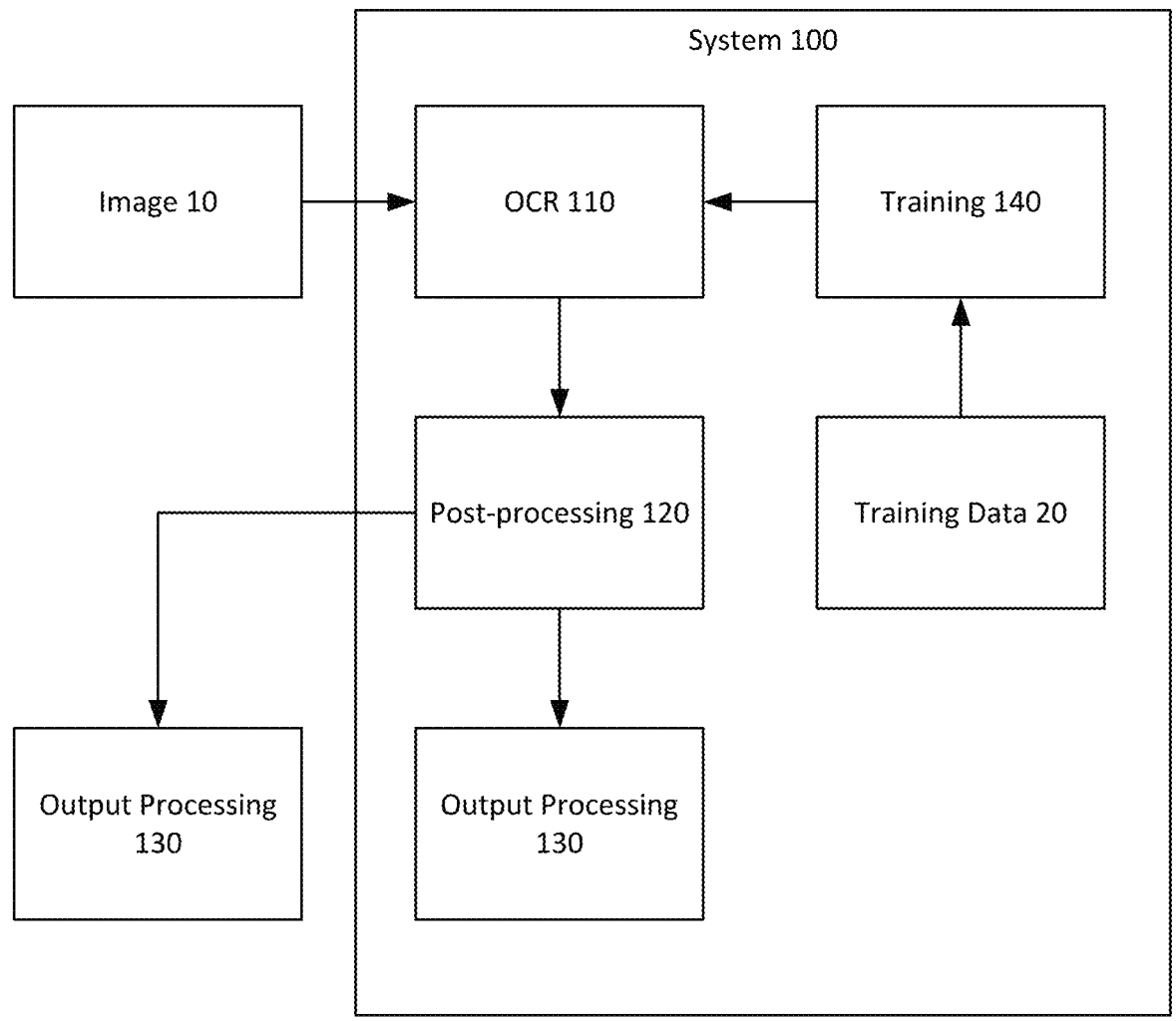
FIG. 1 shows an example OCR and extraction system according to some embodiments of the disclosure.

FIG. 1 shows an example OCR and extraction system 100 according to some embodiments of the disclosure. System 100 may include a variety of hardware, firmware, and/or software components that interact with one another. For example, system 100 can include OCR processing 110, post-processing 120, output processing 130, and/or training processing 140, each of which may be implemented by one or more computers (e.g., as described below with respect to FIG. 7). As described in detail below, system 100 can receive image 10 and perform end-to end OCR and information extraction using OCR processing 110 and post-processing 120. System 100 or an external system can use the results of this processing to provide an output, such as a filled-in form, using output processing 130 (output processing 130 is shown as part of system 100 and external to system 100 to illustrate both alternatives). The operations of OCR processing 110, post-processing 120, and output processing 130 are described in detail below. System 100 may also include training processing 140, which can use training data 120 to train other system components as described in detail below. For example, FIGS. 2-6 illustrate the functioning of system 100 in detail.

System 100 and individual elements of system 100 (e.g., OCR processing 110, post-processing 120, output processing 130, training processing 140) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while OCR processing 110, post-processing 120, output processing 130, and training processing 140 are depicted separately, any combination of these elements may be part of a combined hardware, firmware, and/or software element. Moreover, in practice, there may be single instances or multiples of any of the illustrated elements, and/or these elements may be combined or co-located.

Figure 2:
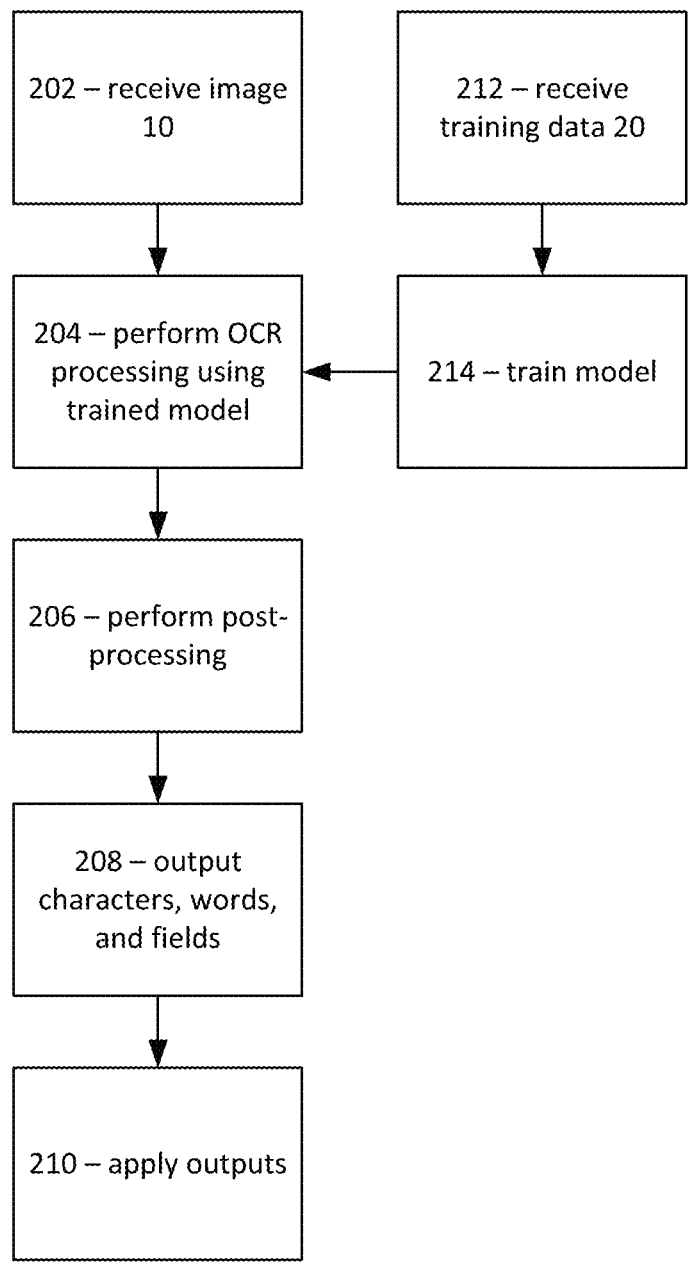
FIG. 2 shows an example OCR and extraction process according to some embodiments of the disclosure.

FIG. 2 shows an example OCR and extraction process 200 according to some embodiments of the disclosure. System 100 can perform process 200 to recognize characters and words within an image 10, and also to recognize fields within the image System 100 can extract content from the fields for other purposes, such as filling forms having similar fields.

Process 200 can be performed as an extension of the Chargrid-OCR model known to those of ordinary skill in the art. See, for example, U.S. Patent Application No. 2020/0082218, the entirety of which is incorporated herein by reference. Process 200 adds a new prediction to Chargrid-OCR's output and extends its capability from OCR only to end-to-end information extraction where field-level information can be directly obtained. For example, process 200 can achieve both field detection and textual information extraction in a single pass.

At 202, system 100 can receive an image 10 for processing. Image 10 may be any data element including image data, such as a computer file, document, image, and/or other digital file or object including text information that may be extracted. Examples of image 10 may include a webpage, printed papers, publications, an invoice, an instruction manual, a slideshow presentation, hand-written notes, and/or other images including text characters. The text information in image 10 may include characters that are organized or unorganized. Image 10 may include characters with predetermined arrangements such as lines, characters that do not follow a predetermined arrangement, and/or characters mixed with graphical images. The characters may take the form of one or more alphabets, letters, numbers, symbols, and/or other images. Characters may include letters, numbers, symbols, words, a collection or combination of letters, numbers, and/or symbols, symbolic marks, images, and/or other visual indicators in image 10.

At 204, system 100 can perform OCR on image 10. For example, system 100 can identify a plurality of characters in the image using a machine learning (ML) model. As described in detail below, in some embodiments the ML aspects of system 100 may include a neural network architecture. This neural network architecture may allow the conversion of images of text into characters and/or fields with a single model and a single computational step. The neural network may receive an image 10 as an input and may output the set of characters found in the image 10, the position of the characters on the image 10, bounding boxes for fields, and/or bounding boxes for characters, words, or lines (e.g., where the bounding boxes define x, y coordinates containing the fields, characters, words, and/or lines as understood by those of ordinary skill in the use of OCR). Using these outputs or a subset of these outputs may allow system 100 to generate a document with optically recognized text and/or to extract field-level data. An example of OCR processing is provided in FIG. 3 and described in greater detail below.

System 100 may recognize characters in an image 10 in a manner faster than existing sequential approaches to OCR processing. The neural network architecture may reduce the number of steps performed to process an image 10. Further, the neural network may offer robustness against possible noise or distortions during processing. Based on the training performed, the neural network may be flexible and adaptable to various types of data, symbols, languages, and characters. Moreover, in the disclosed embodiments, the processing includes field identification allowing data within a given field to be extracted directly from the OCR'd image 10.

Because the neural network may process the complete image 10 in a single step, system 100 may incorporate the global context of surrounding characters, words, paragraphs, and/or the overall structure of the document to identify or characterize particular characters and/or fields. The single step configuration may allow for faster image 10 processing as well as a reduced cost in computational resources. Further, by removing the multiple step or multiple state configuration, system 100 may avoid potential errors that may arise during intermediary processing steps. Because system 100 performs end-to-end processing using deep learning models from the neural network, these intermediary errors may be avoided.

At 206, system 100 can perform post-processing on the OCR output from 204. Post-processing can remove redundancies that can arise in the form of duplicated pixels representing the same character in image 10. For example, after processing at 204, pixels in image 10 can be predicted as belonging to respective characters, words, and/or fields. For each pixel, system 100 may have information describing character identity (including background), width/height of the character bounding box, and/or offset from the pixel to the centers of the character, word, and field bounding boxes to which the pixel belongs. There may be a very large number of predicted bounding boxes and other information, as each pixel may have its own bounding box for each type of classification (e.g., character bounding box, word bounding box, and/or field bounding box). Post-processing can reduce the number of bounding boxes, thereby reducing the size of the final data product and/or increasing the speed of subsequent processing. An example of post-processing is provided in FIG. 4 and described in greater detail below.

At 208, system 100 can output characters, words, and/or fields identified in image 10 through processing at 204 and 206. For example, system 100 can return a list of characters on the page with their bounding boxes, a list of words on the page with their bounding boxes, and/or a list of fields on the page (with words they cover) and their bounding boxes. The last output achieves end-to-end single-step information extraction, while the first two more granular outputs can be used for other purposes.

At 210, system 100 can apply the outputs obtained at 208 for practical uses. For example, this can include overlaying the at least one word-level bounding box and the at least one field-level bounding box on the image to form a masked image including a plurality of optically-recognized characters and one or more predicted fields for at least a subset of the plurality of optically-recognized characters (i.e., a document that has been processed by OCR to include recognized characters, words, and fields). The predicted fields can define portions of the image (e.g., as defined by bounding boxes) where information corresponding to a field is predicted to be found (e.g., a bounding box is predicted to contain text that can be used to fill a "name" field or "Social Security Number" field or the like). This mask can be formed by combining the at least one word-level bounding box and the at least one field-level bounding box, where the at least one word-level bounding box and the at least one field-level bounding box are located in positions corresponding to the groups of characters in the image. As another example, this can include extracting information contained within the one or more predicted fields and populating one or more fillable fields corresponding to the one or more predicted fields with the information. For example, a dynamic form may include fillable fields (e.g., a "name"

filed or "Social Security Number" field or the like) into which information may be entered manually or by an automated process. System 100 can extract information from a predicted field (e.g., text within a predicted "name" field) and insert it into a corresponding fillable field (e.g., the "name" field in the dynamic form).

The model used at 204 will have been pre-trained and/or otherwise prepared prior to use in runtime processing. In addition to the runtime processing of 202-210, system 100 may train and/or retrain the model. For example, at 212, system 100 can receive a labeled training data set 20. At 214, system 100 can train the ML model used at 204 using the labeled training data 20. Such training may include a deep neural network training process including a cross-entropy loss computation for categorical predictions and a regression loss computation for numerical predictions. An example of training is provided in FIG. 6 and described in greater detail below.

Figure 3:
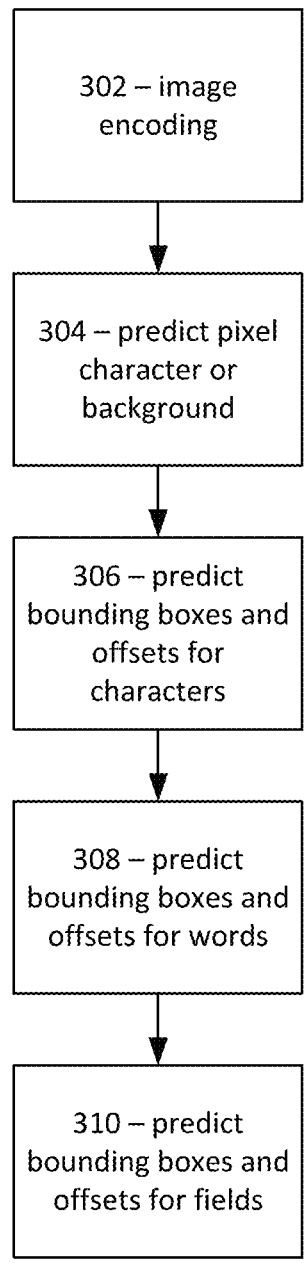
FIG. 3 shows an example OCR process according to some embodiments of the disclosure.
Figure 5A:
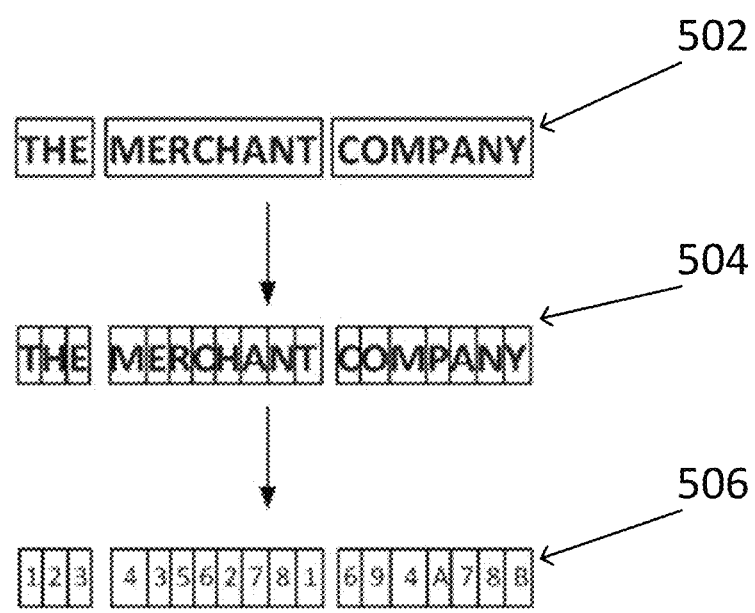
FIGS. 5A-5C show OCR and/or extraction examples according to some embodiments of the disclosure.
Figure 5B:
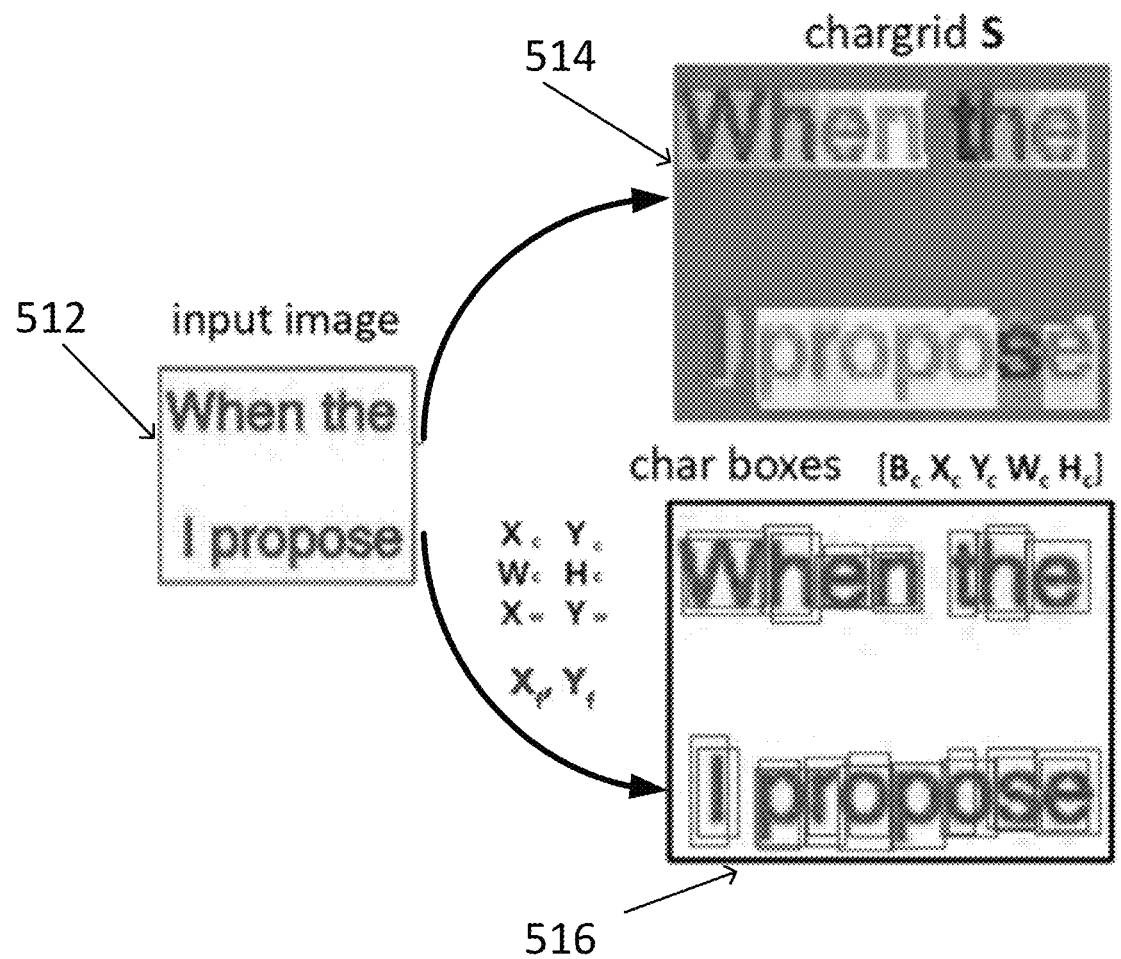
Figure 5C:
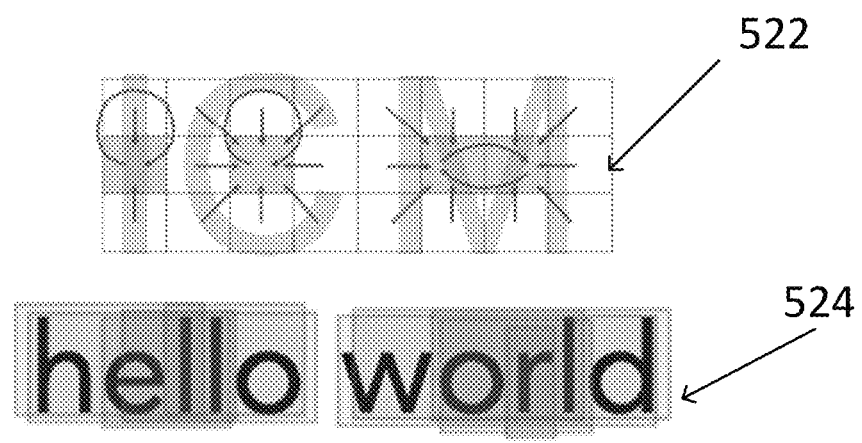

FIG. 3 shows an example OCR process 204 according to some embodiments of the disclosure. OCR process 204 can include an image encoding phase, and then a plurality of prediction phases that can predict pixel-level character or background associations and/or predict bounding box locations. The prediction phases can use ML processing (e.g., at least one mapping function used to perform identifying of pixels and/or bounding boxes and configured from training data supplied to the ML model). FIGS. 5A-5C show OCR and/or extraction examples according to some embodiments of the disclosure, some of which relate to the process of FIG. 3, as indicated below.

In some embodiments, system 100 may use a convolution neural network (CNN) to apply the ML model. A CNN 140 may include an artificial intelligence network and/or may apply ML algorithms to identify desired characters and/or aspects of image 10. The CNN may be trained using training document examples to recognize characters as well as pixel information to identify groups of characters, such as, for example, words, lines, sentences, and/or fields. Based on this training (which is described in greater detail below), the CNN may produce a segmentation mask and/or bounding boxes to generate the OCR version of the image. The segmentation mask may be a version of image 10 where the characters are replaced with an index value, for example.

At 302, system 100 can perform image encoding. In some cases, this may begin by converting an image received by system 100 to greyscale. In other embodiments, the image may already be greyscale when provided to system 100 for OCR processing. In either case, the input to the model is an image that may be in the form of a tensor with shape h(height)*w(width)*1(one channel for greyscale). In the encoder phase, the incoming image tensor may be compressed into smaller tensors with more channels using convolutional filters with strides. Multiple decoder branches (described in detail below) can stem out from the same encoder branch using the same compressed tensor from the encoder as the input.

Encoding may aid in the creation of a segmentation mask by replacing characters of image 10 with an index value. The index value may be assigned according to a mapping function. For example, system 100 may use a predefined dictionary to map the character "A" to an index value of "65" or "0×41." System 100 may have been trained to associate pixel images of characters directly with an index value. For example, system 100 may include an ML model that has been trained to identify the pixels of a hand-written version of the character "A" and associate the pixel image with the index value. System 100 may map identified characters including letters, numbers, and/or symbols to corresponding index values. System 100 may perform this mapping on characters between multiple languages depending on the mapping functions and/or dictionaries utilized when training the ML model.

At 304-310, system 100 can generate at least one word-level bounding box indicating one or more words including at least a subset of the plurality of characters, at least one field-level bounding box indicating at least one field including at least a subset of the one or more words, and/or other bounding boxes. After image encoding, the following processing may leverage one or more decoders. Each decoder gradually may expand the encoded tensor back to its original shape (h*w) using transposed convolutional filters with strides. Skip connections can exist between the encoder and the decoders at matching tensor resolutions for model stability. The following examples of decoder processing may be performed by system 100 applying the trained ML model to image 10 in a manner understood to those of skill in the art (e.g., using the same ML model to process image 10 as was used with training data in a training process).

At 304, system 100 can, for each pixel in image 10, predict whether the pixel is part of a character or a background portion in the image 10. For example, the decoder processing used by system 100 may include an "S" branch and a "B" branch. In the "S" branch, a prediction is made for each pixel in the original image (with h*w pixels) which character it belongs to, or if it is part of the background. In the "B" branch, among other things (discussed below), a prediction is also made for each pixel of whether it is part of a character or the background. After this set of predictions is made, each pixel may be associated with a character or with the background.

At 306, system 100 can predict bounding boxes and offsets for characters. System 100 may convert an identified character to an index value. The index value may correspond, for example, to an ASCII value or a dictionary of words. The conversion may use a mapping function to assign the index value. System 100 may mask the character using the index value. For example, the "B" branch may further predict the width and height of the character bounding box for the character to which it belongs (Wc, Hc) and/or the offset of the pixel to the center of the character bounding box (Xc, Yc). Because a character may occupy a size measured by [width of pixels*height of pixels], masking the character may include representing the area with the index value. System 100 may apply this process to each character of image 10 to generate a segmentation mask.

At 308, system 100 can predict bounding boxes and offsets for words. This may include predicting, for each pixel, a word-level bounding box or a background region to which the pixel belongs and for each pixel belonging to a respective word-level bounding box, determining an offset of the pixel to a center of the respective word-level bounding box. Like the character determination at 306, for each pixel, the "B" branch may predict the offset of the pixel to the center of the word bounding box (Xw, Yw). System 100 may apply this process to each word of image 10 to generate a segmentation mask. To generate the at least one word-level bounding box, for each respective word-level bounding box, system 100 may set a height and width of the at least one word-level bounding box to cause the at least one word-level bounding box to surround each pixel predicted to belong to the respective word-level bounding box.

At 310, system 100 can predict bounding boxes and offsets for fields. Generating at least one field-level bounding box may include predicting, for each pixel, a field-level bounding box or a background region to which the pixel belongs and for each pixel belonging to a respective field-level bounding box, determining an offset of the pixel to a center of the respective field-level bounding box. The predicting of the field-level bounding box may include applying a directed graph algorithm to identify a direction from the pixel towards the center and applying a non-maximum suppression algorithm to remove at least one redundancy. Like the character determination at 306 and word determination at 308, for each pixel, the "B" branch may predict the offset of the pixel to the center of the field bounding box (Xf, Yf). System 100 may apply this process to each word of image 10 to generate a segmentation mask. To generate the at least one field-level bounding box, for each respective field-level bounding box, system 100 may set a height and width of the at least one field-level bounding box to cause the at least one field-level bounding box to surround each pixel predicted to belong to the respective field-level bounding box.

An example is shown in FIG. 5A, where a set of words are surrounded by bounding boxes 502. The bounding boxes 502 can be word-level or field-level bounding boxes. In this example, the individual characters 504 are also surrounded by their own bounding boxes 504. Moreover, the characters 504 map to index values 506. When generating the segmentation mask, the index values may replace the pixel area occupied by the characters. System 100 may assign index values for each character of image 10. For example, the character "M" may map to an index value of "4." The collective index values along with the positioning information for the index values may comprise the segmentation mask. In addition to indexing the characters, system 100 may identify a background class. The background class may refer to the background or "white space" of image 10 and may aid in distinguishing the index values from the background. System 100 may perform this character indexing on identified characters using encoder processing described above and may use decoder processing described above to combine the index values along with the background class to generate a segmentation mask.

Another example is shown in FIG. 5B, where an input image 512, processed as described above, yields "S branch" output 514 and "B branch" output 516. Note that "B branch" output 516 includes bounding boxes at the character, word, and field levels.

Figure 4:
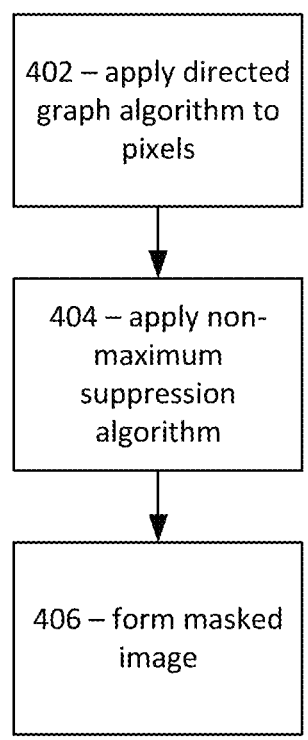
FIG. 4 shows an example post-processing process according to some embodiments of the disclosure.

FIG. 4 shows an example post-processing process 206 according to some embodiments of the disclosure. Post-processing is an additional process, applied beyond the ML pixel and bounding box evaluations described above, to aggregate pixel-level predictions made by the model into meaningful information that can be consumed by downstream services. To obtain distinct characters from pixel-level predictions, duplicated pixels representing the same character may be eliminated first by going through a graph-based method (e.g., Graphcore) then through NMS (non-maximum suppression).

At 402, system 100 can apply a directed graph algorithm to pixels of image 10. For example, system 100 can construct a directed graph where each vertex is a candidate pixel. System 100 can add a directed edge going from pixel A to pixel B if pixel A predicts pixel B as the center of its predicted character box. FIG. 5C shows an example. All the pixels in image 522 point to the pixels close to the center of the characters, and the center pixels point to themselves. In less ideal cases, pixels may point to a different pixel close to the center. By taking the k-core of the resulting graph with k=1, only the loops in the graph are retained At 404, system 100 can apply an NMS algorithm to pixels of image 10. Applying the NMS algorithm may cluster the characters into words or fields, as shown in FIG. 5C at image 524. Each character makes a word and/or field box proposal for the word and/or field to which it belongs based on the word centers predicted by the pixels inside the character. The proposal is such that it extends from the character itself to its reflection on the other side of the predicted word and/or field center (see image 524). The characters closer to the predicted word and/or field center propose a smaller word and/or field box while the characters farther away from the predicted word and/or field center propose a larger word and/or field box. The word and/or field proposals, thus generated, significantly overlap for characters belonging to the same word and/or field and do not or marginally overlap otherwise. System 100 may find clusters of characters whose word and/or field proposals significantly overlap. In order to do this, system 100 may build a graph where each character is a vertex and the edge between a pair of characters indicates whether their proposals significantly overlap (e.g., intersection is more than 50% of the smaller box). System 100 may cluster the characters by finding connected components in this graph. Connected component analysis may be linear in number of characters. Moreover, this way of clustering characters into words and/or fields may allow system 100 to recognize rotated words.

At 406, system 100 can form a masked image. After processing of FIGS. 3 and 4, word-level predictions have been obtained from characters by estimating the word-level bounding boxes from offset to word center and aggregating those predictions that overlap. Field-level predictions, to obtain information specific to each field in a form (e.g., "Employer's name, address, and ZIP code" box in a W2), have been obtained in a similar way, using the offset to the field center from the center of each word.

Figure 6:
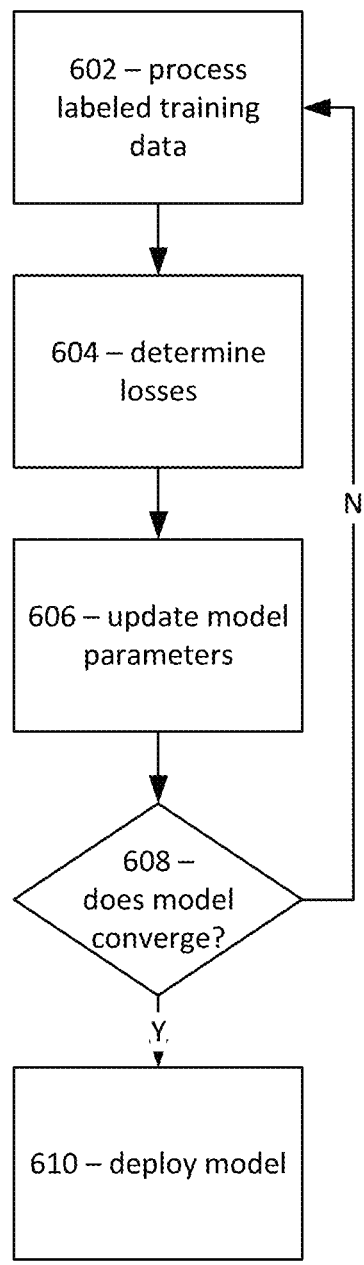
FIG. 6 shows an example training process according to some embodiments of the disclosure.

FIG. 6 shows an example training process 214 according to some embodiments of the disclosure. As discussed above, the ML process used for OCR and character, word, and/or field identification may use a trained model. Training process 214 is an example of how the ML model may be trained in some embodiments.

At 602, system 100 can process labeled training data. For example, the model may be trained using greyscale document images rescaled to the same size, together with their textual content at the pixel level (e.g., where each pixel is labeled with its character identity (with "background" being one of the character classes), the size of the bounding box for the character it belongs to (undefined for background), and its offset to the center of the character, word, and/or field bounding boxes to which it belongs (also undefined for background)).

Labeled training data can include documents labeled with characters, words, and fields (and their respective bounding boxes). The labeled training data can be generated by hand, by OCR, and/or in other ways. The documents included in the labeled training data may include real forms or documents and/or randomly-generated documents (e.g., created by a random string generator). For example, the labeled training data set can include pixel-level labels of at least one of character identity, bounding box size, center offset to character, center offset to word, and center offset to field.

Model training may follow a common approach of training a deep neural network. The model architecture can be randomly initialized. Input images may be passed to the model in minibatches, where the model makes predictions for each pixel of each image in a minibatch.

At 604, system 100 can determine losses for the model. For example, cross-entropy loss may be computed for categorical predictions (character class for "S branch" and binary class for "B branch"). Huber loss may be used as regression loss for numerical predictions (Xc, Yc, Wc, Hc, Xw, Yw, Xf, Yf). The overall loss may be computed as a linear combination of the categorical loss and the regression loss.

At 606, system 100 can update model parameters. For example, the model parameters may be updated with back-propagation of the loss and stochastic gradient descent.

At 608, system 100 can determine whether the model converges after update. If not, processing at 602-606 may be repeated until the model converges. If the model converges, at 610, system 100 can deploy the model for use as described above (e.g., by the process of FIG. 3 or a similar process).

Figure 7:
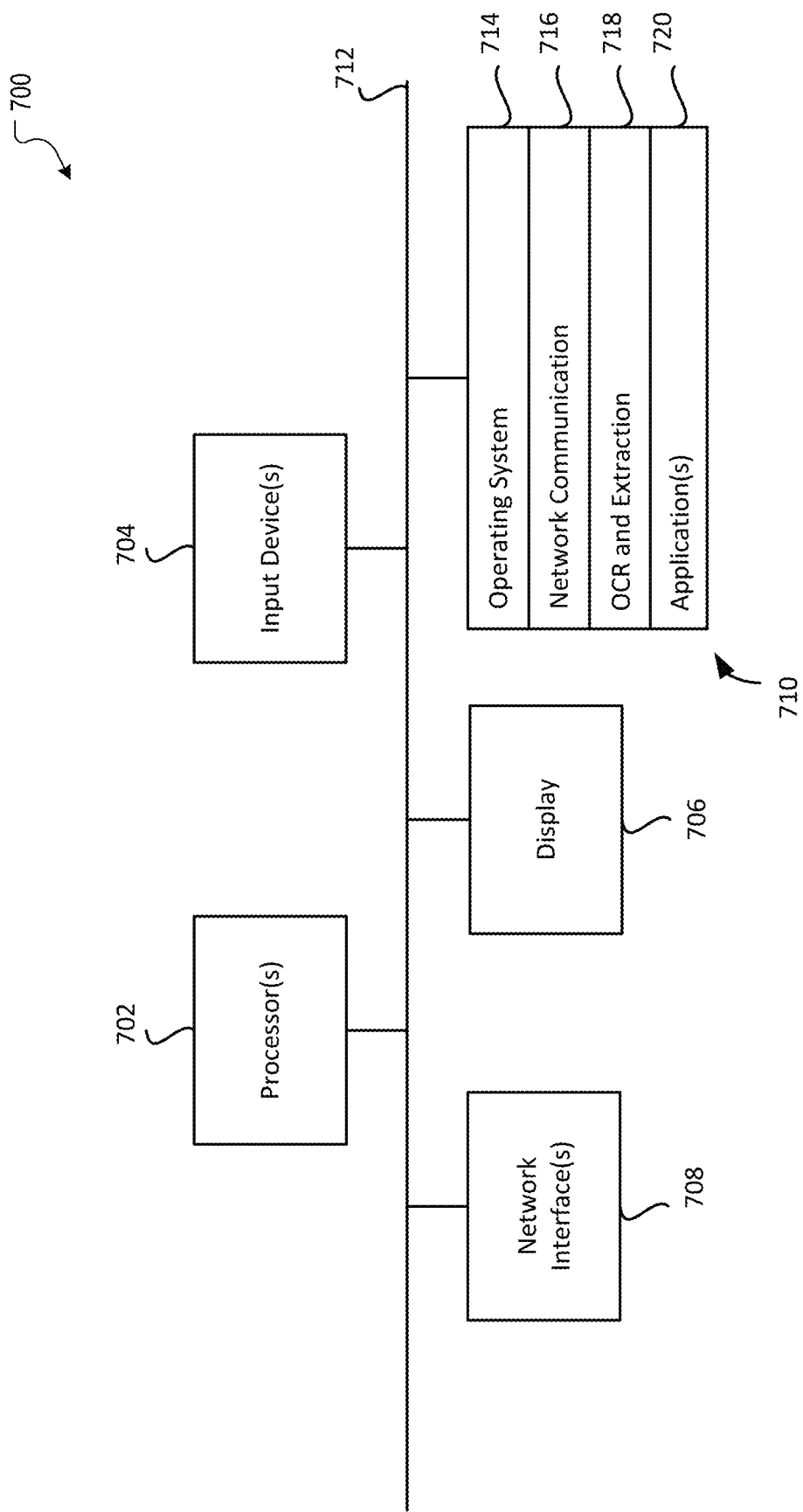
FIG. 7 shows a computing device according to some embodiments of the disclosure.

FIG. 7 shows a computing device 700 according to some embodiments of the disclosure. For example, computing device 700 may function as system 100 or any portion(s) thereof, or multiple computing devices 700 may function as system 100.

Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

OCR and extraction 718 may include the system elements and/or the instructions that enable computing device 700 to perform the processing of system 100 as described above, including OCR processing 110, post-processing 120, output processing 130, and/or training processing 140. Application(s) 720 may be an application that uses or implements the outcome of processes described herein and/or other processes. For example, application(s) 720 may include output processing 130 examples such as form-filling in embodiments where device 10 and system 100 are part of the same overall system. In some embodiments, the various processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, output processing 130 other than form filling may be performed, and indeed the field-level information extracted from images 10 can be used for any purpose in some embodiments. Additionally or alternatively, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor, an image;
   generating, by the processor, at least one field-level bounding box indicating at least one field including at least a subset of one or more characters in the image, the generating of the at least one field-level bounding box comprising:
      predicting, for one or more pixels, a field-level bounding box or a background region to which the pixel belongs, and
      for each pixel belonging to a respective field-level bounding box, determining an offset of the pixel to a center of the respective field-level bounding box; and
   overlaying, by the processor, the at least one field-level bounding box on the image to form a masked image including a plurality of characters and one or more predicted fields for at least a subset of the plurality of characters.

2. The method of claim 1, further comprising:
   extracting, by the processor, information contained within the one or more predicted fields of the masked image; and
   populating, by the processor, one or more fillable fields corresponding to the one or more predicted fields with the information.

3. The method of claim 1, wherein the predicting comprises:
   applying a directed graph algorithm to identify a direction from the pixel towards the center; and
   applying a non-maximum suppression algorithm to remove at least one redundancy.

4. The method of claim 1, wherein the generating of the at least one field-level bounding box comprises, for each respective field-level bounding box, setting a height and width of the at least one field-level bounding box to cause the at least one field-level bounding box to surround each pixel predicted to belong to the respective field-level bounding box.

5. The method of claim 1, further comprising identifying, by the processor, the one or more characters in the image using a machine learning (ML) model.

6. The method of claim 1, wherein the overlaying comprises:
   forming the at least one field-level bounding box into a bounding box mask, wherein the at least one field-level bounding box is located in one or more positions corresponding to the groups of characters in the image; and
   overlaying the bounding box mask on the image.

7. The method of claim 1, wherein the ML model comprises at least one mapping function used by the processor to perform the identifying and configured from training data supplied to the ML model.

8. A method comprising:
   training, by a processor, a machine learning (ML) model using a labeled training data set;
   receiving, by the processor, an image;
   generating, by the processor, at least one field-level bounding box indicating at least one field including at least a subset of one or more characters in the image, the generating of the at least one field-level bounding box comprising:
      predicting, for each pixel, a field-level bounding box or a background region to which the pixel belongs, and for each pixel belonging to a respective field-level bounding box, determining an offset of the pixel to a center of the respective field-level bounding box; and overlaying, by the processor, the at least one field-level bounding box on the image to form a masked image including a plurality of characters and one or more predicted fields for at least a subset of the plurality of characters.

9. The method of claim 8, wherein the labeled training data set includes pixel-level labels of at least one of character identity, bounding box size, center offset to character, center offset to word, and center offset to field.

10. The method of claim 8, wherein the training comprises a deep neural network training process including a cross-entropy loss computation for categorical predictions and a regression loss computation for numerical predictions.

11. The method of claim 8, further comprising:
extracting, by the processor, information contained within the one or more predicted fields of the masked image; and
populating, by the processor, one or more fillable fields corresponding to the one or more predicted fields with the information.

12. The method of claim 8, wherein the predicting comprises:
applying a directed graph algorithm to identify a direction from the pixel towards the center; and
applying a non-maximum suppression algorithm to remove at least one redundancy.

13. The method of claim 8, wherein the generating of the at least one field-level bounding box comprises, for each respective field-level bounding box, setting a height and width of the at least one field-level bounding box to cause the at least one field-level bounding box to surround each pixel predicted to belong to the respective field-level bounding box.

14. A system comprising:
a processor; and
a non-transitory memory in communication with the processor storing instructions that, when executed by the processor, cause the processor to perform processing comprising:
receiving an image;
generating at least one field-level bounding box indicating at least one field including at least a subset of one or more characters in the image, the generating of the at least one field-level bounding box comprising:

predicting, for each pixel, a field-level bounding box or a background region to which the pixel belongs, and for each pixel belonging to a respective field-level bounding box, determining an offset of the pixel to a center of the respective field-level bounding box; and overlaying the at least one field-level bounding box on the image to form a masked image including a plurality of characters and one or more predicted fields for at least a subset of the plurality of characters.

15. The system of claim 14, wherein the processing further comprises:
extracting information contained within the one or more predicted fields of the masked image; and
populating one or more fillable fields corresponding to the one or more predicted fields with the information.

16. The system of claim 14, wherein the processing further comprises identifying, by the processor, the one or more characters in the image using a machine learning (ML) model.

17. The system of claim 14, wherein the predicting comprises:
applying a directed graph algorithm to identify a direction from the pixel towards the center; and
applying a non-maximum suppression algorithm to remove at least one redundancy.

18. The system of claim 14, wherein the generating of the at least one field-level bounding box comprises, for each respective field-level bounding box, setting a height and width of the at least one field-level bounding box to cause the at least one field-level bounding box to surround each pixel predicted to belong to the respective field-level bounding box.

19. The system of claim 14, wherein the overlaying comprises:
forming the at least one field-level bounding box into a bounding box mask, wherein the at least one field-level bounding box is located in one or more positions corresponding to the groups of characters in the image; and
overlaying the bounding box mask on the image.

20. The system of claim 14, wherein the ML model comprises at least one mapping function used by the processor to perform the identifying and configured from training data supplied to the ML model.

* * * * *